United States Patent Office 3,432,444
Patented Mar. 11, 1969

3,432,444
METHOD OF CURING EPOXY RESINS EMPLOYING DIFLUOROAMINO COMPOUNDS AS CATALYSTS
Orval E. Ayers, Chester W. Huskins, and Herbert A. Carter, Huntsville, Ala., assignors to the United States of America as represented by the Secretary of the Army
No Drawing. Filed Oct. 10, 1962, Ser. No. 229,765
U.S. Cl. 260—2　　　　　　　　　　　　　　7 Claims
Int. Cl. C08g 51/84, 30/00

The invention described herein may be manufactured and used by or for the Government for governmental purposes without the payment of any royalty thereon.

This invention relates to the curing of epoxy resins and more particularly to the use of novel catalysts in the curing of epoxy resins.

Epoxy resins are normally cured with any of the conventional epoxy curing agents or catalysts, as they are sometimes called. These include various types of aliphatic and aromatic amines, acids, and acid anhydrides as well as commercially available agents such as the Epon curing agents. It has been observed that some epoxy resins cannot be cured with certain amine type curing agents. The use of the amines alone in concentrations required to effect a complete cure will result in a pot life which is too short for most uses or else will react so rapidly that the materials cannot be uniformly combined before gelation occurs.

Therefore an object of this invention is to provide a new method of curing epoxy resins.

A further object of the instant invention is to provide a method of curing epoxy resins employing difluoroamino compounds as catalysts.

A still further object of this invention is to provide a method of curing epoxy resins at room temperature and with negligible heat of reaction through the use of difluoroamino-substituted compounds.

Another object of this invention is to provide a simple method of curing epoxy resins which are difficult to cure with conventional curing agents.

Accordingly, these and other objects are accomplished by the mixing of epoxy resins with difluoroamino compounds in prescribed proportions.

The difluoroamino compounds used to catalyze the curing of epoxy resins are generally prepared by reacting an ethylenically unsaturated compound with tetrafluorohydrazine at elevated temperatures and atmospheric pressure or superatmospheric pressure. For example, 2,3-bis-(difluoroamino)-propyl formate can be prepared by reacting allyl formate with tetrafluorohydrazine at 110° C. and atmospheric pressure. The liquid reaction product can be separated from the gases in the reactor by vacuum distillation and condensation.

The difluoroamino compounds fall into the categories of (a) esters, (b) carbonyl containing compounds, (c) nitriles, (d) ethers, (e) hydrocarbons, and (f) substituted hydrocarbons. The following compounds are examples of the difluoroamino compounds but are not inclusive and are not to be considered a limitation to the invention:

(1) propionyl difluoroamide,
(2) 2,3-bis(difluoroamino) propyl formate,
(3) 2,3-bis(difluoroamino) propionitrile,
(4) 2,3-bis(difluoroamino) propyl allyl ether,
(5) 1,2,3-tris(difluoroamino) propane.

The epoxy resins cured are of the commercially available aliphatic or aromatic type such as the Epon resins. Examples of these compounds are Epon 812 or 1,2,3-tris-(2,3-epoxypropoxy) propane, Epon 828 or diglycidylether of bisphenol A, and Epon X–701 or poly(allyl glycidyl ether). These resins are chosen for purposes of illustration and clarification and are in no way limiting.

The mono- and polydifluoroamino compounds of the types listed above will catalyze the curing of aliphatic and aromatic epoxy resins to give solid polymers of varying hardness. These catalysts are suitable for curing epoxy resins that react with difficulty with certain other catalysts. Generally, with these catalysts, the curing process can be carried out at room temperature with a negligible heat of reaction. However, some of the catalysts may give an exothermic reaction with certain types of epoxy compounds. The heat liberated, in these instances, is still much less than that given off by most of the other methods of curing. The process of this invention further provides for a varying pot life depending upon the amount of difluoroamino compound employed. This overcomes the short pot life accompanying many methods of curing involving conventional amine catalysts. This process is not restricted to operation at room temperature but can be carried out at any temperature normally employed in curing epoxy resins.

The results of experimental tests have indicated that in some cases part or all of the catalytic effect of the difluoroamino compounds is due to hydrogen fluoride which is eliminated from the difluoroamino compounds.

In general this process involves the thorough mixing of a difluoroamino compound with an epoxy compound, the ratio of difluoroamino compound being approximately 0.01–.05 mole per mole of epoxy compound. This ratio is not critical and may go as high as one mole of difluoroamino compound per mole of epoxy compound. However, to function catalytically the ratio should be in the range stated previously. The mixture is allowed to stand at room temperature. The time required for the curing varies with the difluoroamino compound used and the epoxy resin to be cured. Some difluoroamino compounds may affect a cure in 5 minutes while others may require 72 hours. In all cases the polymer formed is hard and solid.

The polymers produced by this method can be used for coatings, castings, laminates, and other areas where cured epoxy resins are normally used.

The invention is further illustrated by the following examples without being limited to the specific compounds used therein.

EXAMPLE I

Preparation of 1,2,3-tris(difluoroamino)-propane 1.5 ml. (0.01735 mole) of allyl bromide were placed in a liter flask and cooled in a Dry Ice-acetone bath. The system was evacuated and 0.0347 mole $H_2F_4$ was added. The mixture was heated for 3 hours at 145° C. The products were allowed to stand overnight in the reaction flask. The products were distilled. This was accomplished by heating the reaction flask with a hot air dryer and pumping the system through Dry Ice-acetone and liquid nitrogen traps. The impure product contained in the Dry Ice-acetone trap is warmed to room temperature and washed with concentrated sulfuric acid. The 1,2,3-tris(difluoroamino)-propane forms a separate layer at the top of the solution. This layer is decanted and distilled. The B.P. is 1270° C. at atmospheric pressure.

EXAMPLE 2

Synthesis of 2,3-bis(difluoroamino)-propyl formate

One milliliter of allyl formate was placed in a five-hundred milliliter round bottom flask. The flask was connected to a glass vacuum manifold and cooled to −78° C. using a Dry Ice-acetone bath and then evacuated to a pressure of 1 mm. of Hg or less and checked for leaks. Tetrafluorohydrazine was added until the pressure rose to approximately 200 mm. of Hg (measured at −78° C.).

The flask and its contents were then allowed to warm to room temperature and thereafter heated for four hours at a temperature which was maintained between 100° C. to 110° C. Excess gaseous tetrafluorohydrazine was removed and the product, 2,3-bis(difluoroamino)-propyl formate was recovered by vacuum distillation at a pressure of one to two millimeters of mercury and a temperature of 35° C. to 40° C. Analysis calculated for $C_4H_6O_2N_2F_4$.—C, 25.25; H, 3.16; F, 40.0. Found: C, 24.25; H, 3.15; F, 38.85.

The 2,3-bis(difluoroamino)-propyl formate was further analyzed by its infrared spectra which showed absorption bonds of 11.0 to 12.3 microns. This absorption is characteristic of the N—F bond. The nuclear magnetic resonance spectra indicated the presence of two adjacent difluoroamino groups with one group being on an end carbon atom.

EXAMPLE 3

Synthesis of 2,3-bis(difluoroamino)-propionitrile

By the substitution of acrylonitrile for the allyl formate in the procedure for the synthesis of 2,3-bis (difluoroamino) propyl formate, there is produced 2,3-bis(difluoroamino) propionitrile which is recovered at a pressure of 1 to 3 millimeters of mercury and a temperature of 25° C. to 30° C.

EXAMPLE 4

Synthesis of 2,3-bis(difluoroamino) propyl allyl ether 1.0 ml. of allyl ether (0.0082 mole) was added to a 500 ml. round bottom Pyrex flask. The flask and its contents were cooled in a Dry Ice-acetone bath and then the entire system was evacuated and checked for leaks. Approximately 0.010 mole $N_2F_4$ was added to the evacuated flask. The flask was allowed to warm to room temperature and then heated at 100° C. to 110° C. for about 4 hours. The product was vacuum distilled and identified. Infrared spectra, NMR spectra, and fluorine analysis proved the compound to be 2,3-bis(difluoroamino) propyl allyl ether.

EXAMPLE 5

Synthesis of propionyl difluoroamide 0.5 ml. (0.0069 mole) of propionaldehyde and 2 drops of ditertiary butyl peroxide (catalyst) were measured into a 250 ml. Pyrex flask. The liquids were cooled with a Dry Ice-acetone bath and then the flask was evacuated. Approximately 0.007 mole $N_2F_4$ was added to the flask. The vacuum stopcock on the flask was closed and secured with a metal clamp. The flask and its contents were heated in an oil bath for about 3 hours at 150° C. The reaction product was vacuum distilled and identified. Infrared spectra, NMR spectra, and fluorine analysis proved the compound to be propionyl difluoroamide.

EXAMPLE 6

Mono(difluoroamino) compounds as catalysts 6.0 grams of Epon 812 were placed into a 50 ml. beaker and 0.2 gram of propionyl difluoroamide was added. The two compounds were thoroughly mixed and then allowed to stand at room temperature. The curing reaction was exothermic and formed a clean, hard, solid polymer in approximately 5 minutes.

EXAMPLE 7

Using the same procedure employed in Example 6, 6.0 grams each of Epon 812 and Epon X–701 were mixed individually with 0.2 gram of propionyl difluoroamide. The compounds cured to hard, solid polymers in about 48 hours at room temperature. No exothermic reaction was observed with these two compounds.

EXAMPLE 8

Bis(difluoroamino) compounds as catalysts

Using the procedure employed in Example 6, 2,3-bis (difluoroamino) propyl formate (0.2 gram) was added to individual samples of 6.0 grams of Epon 812, Epon 828, and Epon X–701. Again hard, solid polymers were obtained after the mixture stood at room temperature for approximately 48 hours. This example was repeated twice using 2,3-bis(difluoroamino) propionitrile and then 2,3-bis (difluoroamino) propyl allyl ether in the place of 2,3-bis(difluoroamino) propyl formate. In both cases solid polymers were obtained from the epoxy resin compounds.

EXAMPLE 9

Tris(difluoroamino) compounds as catalysts

Using the procedure employed in Example 6, 0.2 gram of 1,2,3-tris(difluoroamino) propane was added to individual samples of 6.0 grams of Epon 812, Epon 828, and Epon X–701. Hard, solid polymers were obtained after the mixtures stood at room temperature for approximately 48 to 72 hours.

The detailed description has been given for purposes of illustration only and no unnecessary limitations are to be understood therefrom. The invention is not limited to the exact details shown and described, for obvious modifications will occur to those skilled in the art. Therefore the invention is limited only by the appended claims.

We claim:
1. A process for curing epoxy resins having a plurality of epoxy groups per molecule with each epoxy group having an oxygen atom bonded to two commonly bonded carbon atoms, said process comprising the blending of said epoxy resins with a difluoroamino compound selected from the group consisting of propionyl difluoroamide, 2,3-bis (difluoroamino) propyl formate, 2,3-bis (difluoroamino) propionitrile, 2,3-bis (difluoroamino) propyl allyl ether, and 1,2,3-tris (difluoroamino) propane, which acts as a catalyst.
2. The process of claim 1 wherein the difluoroamino catalyst is employed in an amount ranging from 0.01 to .05 mole per mole of epoxy resin.
3. The process of claim 2 wherein the difluoroamino compound is propionyl difluoroamide.
4. The method of claim 2 wherein the difluoroamino compound is 2,3-bis(difluoroamino) propyl formate.
5. The process of claim 2 wherein the difluoroamino compound is 2,3-bis(difluoroamino) propionitrile.
6. The process of claim 2 wherein the difluoroamino compound is 2,3-bis(difluoroamino) propyl allyl ether.
7. The process of claim 2 wherein the difluoroamino compound is 1,2,3-tris(difluoroamino) propane.

References Cited

UNITED STATES PATENTS 2,783,214   2/1957   Homan _____ 260—47

OTHER REFERENCES

Grant, "Hackh's Chemical Dictionary," third ed., p. 310 relied on, Philadelphia, 1944.

Lee et al., "Epoxy Resins," p. 15 relied on, N.Y., 1957.

WILLIAM H. SHORT, *Primary Examiner.*

T. PERTILLA, *Assistant Examiner.*

U.S. Cl. X.R.

260—88.3, 47